(12) United States Patent
Ohlsson et al.

(10) Patent No.: US 11,516,426 B1
(45) Date of Patent: Nov. 29, 2022

(54) SYSTEM AND METHOD FOR ROBUST REMOTE VIDEO RECORDING WITH POTENTIALLY COMPROMISED COMMUNICATION CONNECTION

(71) Applicant: Axis AB, Lund (SE)

(72) Inventors: Emma Holmberg Ohlsson, Lund (SE); Jonathan Karlsson, Lund (SE); Fredrik Brozén, Lund (SE); Viktor Andersson, Lund (SE); Per Johansson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/534,484

(22) Filed: Nov. 24, 2021

(51) Int. Cl.
| | |
|---|---|
| *H04N 5/77* | (2006.01) |
| *H04N 7/18* | (2006.01) |
| *H04N 5/232* | (2006.01) |

(52) U.S. Cl.
CPC ........... *H04N 5/77* (2013.01); *H04N 5/23206* (2013.01); *H04N 5/23299* (2018.08); *H04N 7/18* (2013.01)

(58) Field of Classification Search
CPC .. H04N 5/77; H04N 5/23299; H04N 5/23206; H04N 7/18
See application file for complete search history.

(56) References Cited

U.S. PATENT DOCUMENTS

| | | | | |
|---|---|---|---|---|
| 7,620,701 | B2 * | 11/2009 | Niimura | H04N 1/00214 709/224 |
| 7,814,151 | B2 * | 10/2010 | Kuhlke | H04L 67/06 709/227 |
| 2007/0182819 | A1 | 8/2007 | Monroe | |
| 2010/0333155 | A1 * | 12/2010 | Royall | H04N 21/2387 348/207.1 |
| 2012/0224825 | A1 | 9/2012 | Royall et al. | |
| 2015/0296241 | A1 | 10/2015 | Russo et al. | |
| 2017/0214982 | A1 * | 7/2017 | Cowherd | H04N 5/23206 |
| 2020/0051413 | A1 | 2/2020 | Phillips et al. | |

\* cited by examiner

*Primary Examiner* — Thai Q Tran
*Assistant Examiner* — Jose M Mesa
(74) *Attorney, Agent, or Firm* — Xsensus LLP

(57) ABSTRACT

A system, apparatus, computer program product, and method perform controlled video recording of video captured by a camera. The method includes checking by recorder circuitry of receipt of a ping signal sent from a server to the recorder, the ping signal being expected to be received by the recorder circuitry within a predetermined time interval after an earlier ping signal was received (or when an initial ping signal was expected to be received), in response to a determination by the recorder circuitry of not receiving the ping signal, entering an autonomous recording mode, the autonomous recording mode including recording video provided from at least one camera, and continuing operation of the autonomous recording mode until at least one of receiving another ping signal by the recorder circuitry, or receiving a control signal from the server that directs the recorder to stop recording the video provided from the at least one camera.

20 Claims, 7 Drawing Sheets

SYSTEM AND METHOD FOR ROBUST REMOTE VIDEO RECORDING WITH POTENTIALLY COMPROMISED COMMUNICATION CONNECTION

BACKGROUND

Technical Field

The present disclosure relates to image capturing and recording devices, systems, and methods. More particularly, the present disclosure relates to devices, systems, and methods that operate in a multi-device environment and conserve communication bandwidth and recording space yet self-protect against potential security breaches by bad actors who attempt to disrupt inter-device communications to avoid having their image captured by the system.

Discussion of the Background

Monitoring systems for monitoring of premises, areas of particular interest and/or processes connected via a computer network to monitoring or surveillance servers are increasingly popular, in particular such monitoring systems including digital monitoring cameras. One reason for the popularity of such systems may be that the systems to a great extent may utilize an existing network, if a computer network already is in place.

Another reason for using a general computer network as a surveillance network may be that the network that has to be built for the monitoring system may be used to connect other types of equipment, e.g., computers, servers, and peripherals. For these reasons the technology suits organizations/persons in need of only a single or few monitoring devices as well as organizations/persons in need of a great number of monitoring devices.

In one such monitoring system, the monitoring devices are arranged to send their monitoring data to a service server which processes the monitoring data or information in order to prepare the data for access to monitoring data by a user, for logging monitoring information, for storing monitoring data, or for object recognition.

As the popularity for transmitting large amounts of content increases, such as streaming video and/or audio, the demands and reliance on the network infrastructure increase in parallel with user's reliance on successful delivery of the content. However, there are times when one or more components of the system delivering the content are not available to participate in the transmission. For example, a network may be malfunctioning or a client computing device may be busy with other tasks. In these instances, it is important that the content to be transferred is not lost.

Conventionally, the content was just lost, or it was captured locally at the camera, such as with a SD card, or some other local memory, which required physical retrieval before the content could be reviewed. Thus, in these situations, the burden has been on the camera to notice the loss of connection because it is not able to transmit the captured video.

External recorders have also been used to record video/images from one or more cameras. The recorder is either hardwired to the camera(s), but can also be connected via wireless connections, such as Bluetooth or Wi-Fi. In more sophisticated schemes, a central server or workstation is used to control operation of the camera(s) as well as the recorder. The workstation often includes software tools to help an operator detect possible security issues (e.g., facial recognition, and/or object recognition) to alert the operator of a potential security situation that may be arising. It is these networked systems, with a central, smart controller (workstation), that have evolved as a favorite approach for providing security monitoring and recording.

SUMMARY

The present inventors recognized that in a networked environment, a video security system uses communication links between the cameras, a recorder, and a central controller. However, if the communication link between the controller and recorder malfunctions, or is purposefully disrupted by a nefarious actor, the system may lose an opportunity to capture, and retain, vital video images that could later be used to retroactively determine the nature of the security breach. For example, a bad actor may purposefully cut the communication link between central controller and recorder, knowing that the break in the communication link will prevent the recorder from receiving recording instructions. The recorders include a buffer memory that runs continuously, but due to a limited memory size, the buffer memory cannot capture and hold the relevant video information captured at the time the communication link went down, and thereafter.

In light of the potential vulnerability in the surveillance system, the present inventors identified a dual mode-operation for the recorder: one normal operation mode where the recorder operates under control of the central controller, or workstation, and a second operational mode where the recorder itself determines that the communication channel between recorder and the central controller may have been compromised and so the recorder switches to an autonomous, fail-safe, mode of operation. Moreover, to ensure a reliable transition in the event of a communication disruption, the central controller and the recorder use a communication protocol where the central controller sends "pings" (small messages that are uniquely sent by the central controller to the recorder) at known intervals (regular intervals, or known intervals that are not sent at regular times, but are nevertheless known by the recorder). If the recorder fails to receive a ping within the known interval, the recorder on its own initiative enters the self-controlled mode of operation, which at least involves capturing the contents of the memory buffer, as well as continually capturing additional content from the cameras for a duration after the recorder determines the ping had not arrived, as expected. By transitioning in this way, the recorder is able to record, and retain, the video at a time before the detection that the ping signal was not received (i.e., recording the content of the memory buffer, where amount of the recording before the ping signal is a function of the size of the memory buffer), as well as the video content from the camera received after a time the ping signal was expected, but not received.

To the extent the recorder has another communication channel available for conveying its detection of its transition to the self-controlled mode of operation, it may also send alert messages, such as an e-mail, a text message, or another form of wired or wireless communication. In one option, the recorder, reports to the cameras the detected connection failure with the central controller, and to the extent the cameras have a separate communication channel to the central controller or perhaps via a relay device, the camera(s) can report that the communication channel between the recorder and the central controller is down. In turn, security personnel may be dispatched to the scene. Likewise, other cameras on other systems may be controlled to pan, tilt, and/or zoom regions near the affected cameras.

Accordingly, one aspect of the present disclosure is a new video recording scheme that includes checking for connectivity between a video management server and a video recorder, and includes measures to trigger the video recorder to operate in an autonomous mode, in response to detection of a communication disruption between the video recorder and the video management server.

According to another aspect, the present disclosure describes a method of recording video in a recorder, that includes checking by recorder circuitry of receipt of a ping signal sent from a server to the recorder, the ping signal being expected to be received by the recorder circuitry within a predetermined time interval after an earlier ping signal was received, in response to a determination by the recorder circuitry of not receiving the ping signal, entering an autonomous recording mode, the autonomous recording mode including recording video provided from at least one camera, and continuing operation of the autonomous recording mode until at least one of receiving another ping signal by the recorder circuitry, or receiving a control signal from the server that directs the recorder to stop recording the video provided from the at least one camera.

Other aspects include a system, and recorder that implement the above-described, and other, method(s), as well as a non-transitory computer readable storage device that includes a program that, once executed by processing circuitry, causes the processing circuitry to execute the above-described, and other, method(s).

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least encoding and decoding in an image processing system.

Figure 1:
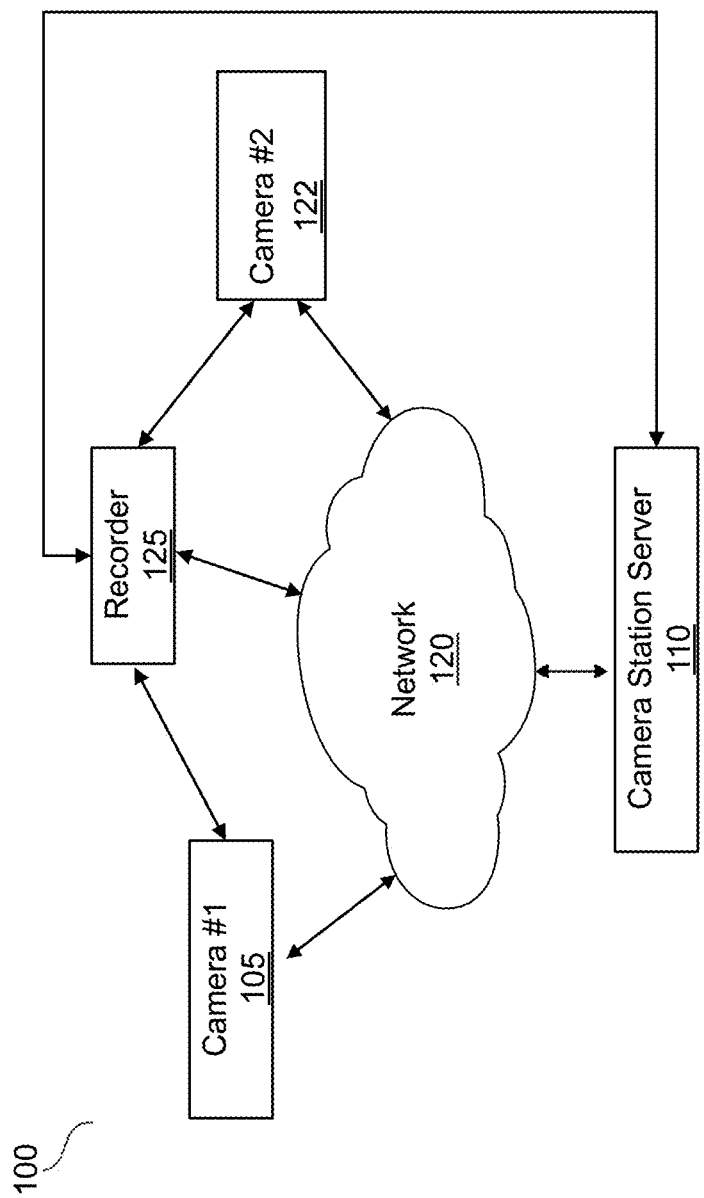
FIG. 1 is a system diagram of a video recording and control system according to an embodiment of the present disclosure.

FIG. 1 is a is a system diagram of a video recording and control system 100 that includes a camera station server 110, recorder 125, camera #1 105 and camera #2 122. A network 120 may be wired, wireless, or a wired/wireless hybrid. Likewise, the network 120 may be a completely private network, a public (e.g., IP), or hybrid network (part private and part public). As shown in FIG. 1, the camera station server 110 may also have a separate direct communication channel (e.g., Ethernet, optical fiber, or the like) to recorder 125. Although not shown, similar direct communication channels may be used between the camera station server 110 and each of the cameras 105, 122. Similarly, the cameras 105, 122 may have dedicated communication channels to provide video data to the recorder 125, which may be direct, hardwired connections. More detailed configurations are described for the cameras 105, 122 in FIG. 2. Likewise, FIG. 3 shows a more detailed configuration for the recorder 125, where the control circuitry of the recorder 125 may be structured as shown in FIG. 7. FIG. 7 may also be the structure employed for the camera station server 110. Processes and algorithms employed by these devices are described in reference to FIGS. 4-6.

Returning to FIG. 1, camera #1 105 may be the same type of camera as camera #2 122, or they may be different kinds of cameras. The common function is that cameras used in the system 100 have a capability of providing video to the recorder 125. For example, camera #1 105 may be a pan/tilt/zoom (PTZ) camera, and/or a camera with an adjustable field of view (such as that described in U.S. Pat. Nos. 8,648,916 and 10,397,485, the entire contents of each of which being incorporated herein by reference), or camera #2 122 which may be a body-worn camera, like that described in US20210289162A1, the entire contents of which being incorporated herein by reference in its entirety. Cameras #1 and #2 (105, 122), after being initialized, capture moving images (and optionally sound) within their respective fields of view and provide the videos to the recorder 125 either directly via connected communication channels or over the network 120.

The recorder 125 includes a buffer memory (e.g., semiconductor memory), as will be discussed and a bulk memory, which may be internal, and/or a peripheral storage device. The recorder 125 constantly records, in separate files (or channels), in buffer memory all of the video provided from each camera. However, the buffer memory has a limited capacity and thus is implemented as a first-in, first-out (FIFO) memory. The amount of video retained by the buffer memory is a directly related to the size of the buffer memory and the information capacity of the video content. For example, if the buffer memory for each camera is 1 GByte, and 20 minutes of video (at a particular frame rate and resolution) requires a 1 GByte storage size, then the buffer memory has a 20 minute capacity. Thus, a video segment recorded 20 minutes and 1 second ago is replaced by presently recorded video. One, non-limiting, example of a recorder 125 that provides the buffering and recording function is available from AXIS AB in its recorder S3008 RECORDER. In one example, the recorder can be incorporated into the camera, and use as its recording medium an SD card, flash memory, or the like.

As will be discussed in more detail later, the camera station server 110 receives video streams via the recorder 125. One use-case is to provide a remote monitoring service that also provides remote access control. For example, the camera station server 110 includes a displayed video of the scene captured by the camera(s), and also operates with a door controller, for example. One non-limiting example is AXIS A1601 NETWORK DOOR CONTROLLER, which permits an operator of the camera station server 110 to first check the video of a scene near the door controller, and then based on operator control, can "buzz" the person through the door (i.e., remotely unlock or open the door). The camera station server 110 may include search software that can perform object detection in video to detect particular people or other objects, such as cars, trucks, bicycles, etc. Another use case is the camera station server 110 detecting motion in video, and responding by having the recorder 125 record in bulk memory the video received from that camera, and perhaps other cameras within line of the area in which the motion was detected.

Suppose a bad actor is aware of the surveillance and access control system. It is, therefore, conceivable, the bad actor can sever the connection (or shield the RF communication capability) between the recorder 125 and camera station server 110, thus deactivating the ability of the camera station server 110 from being able to control the recorder 125. In a conventional application, the recorder 125 would merely continue to operate, recording in its buffer memory the video provided to it. However, because the recorder 125 did not receive a trigger signal from the camera station server 110, the recorder 125 would not know to transfer the video captured in the buffer memory, or any continuation of a recording, to bulk memory so as to record the people or objects near the camera.

In view of this limitation, the present inventors, conceived of a fail-safe approach that places the burden on the recorder 125 to make an affirmative determination after a predetermined period of time (ideally to correspond with the amount of video-time that is supported by the buffer memory) to perform a recording operation to bulk memory as if the recorder 125 received a trigger signal from the camera station server 110. The fail-safe process is described in more detail herein, but for the moment it is sufficient to note that if the recorder 125 determines that the connection with the camera station server 110 is not functioning properly, the recorder 125 enters a self-operation mode (autonomous mode), where it stores video that is output from the buffer memory into bulk memory. By the way, the bulk memory can be an internal (or peripheral) hard drive, tape drive, flash memory, optical memory, semiconductor memory, magnetic memory or the like. In this way, if a bad actor interferes with the connection to the camera station server 110, the camera will capture the activity and the recorder 125 will record the captured video before the connection went down and continue recording until after another control signal is received.

As will be discussed in more detail, the camera station server 110 sends "ping" (beacon) signals to the recorder 125 at known time intervals (periodic, or aperiodic but known a priori), and if the recorder 125 does not receive a ping at an expected time, the recorder 125 transitions to the self-operation mode and begins to capture the video in bulk memory. The recorder 125 does not always operate in the self-operation mode because the recorder 125 has a limited bulk memory capacity (e.g., 2 TB to 8 TB).

Figure 2:
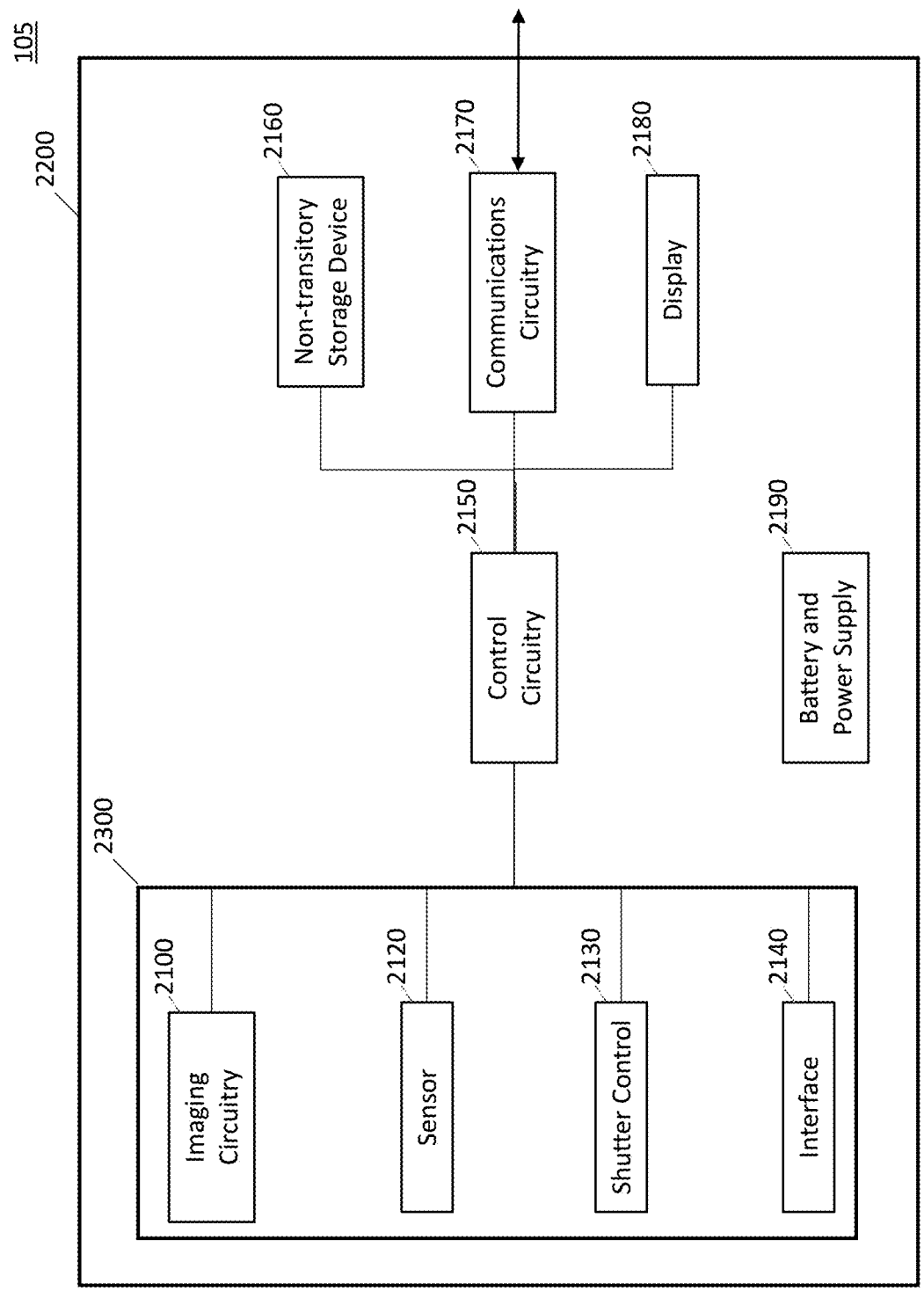
FIG. 2 is a diagram of a camera that streams video to a recorder according to the present disclosure.
Figure 3:
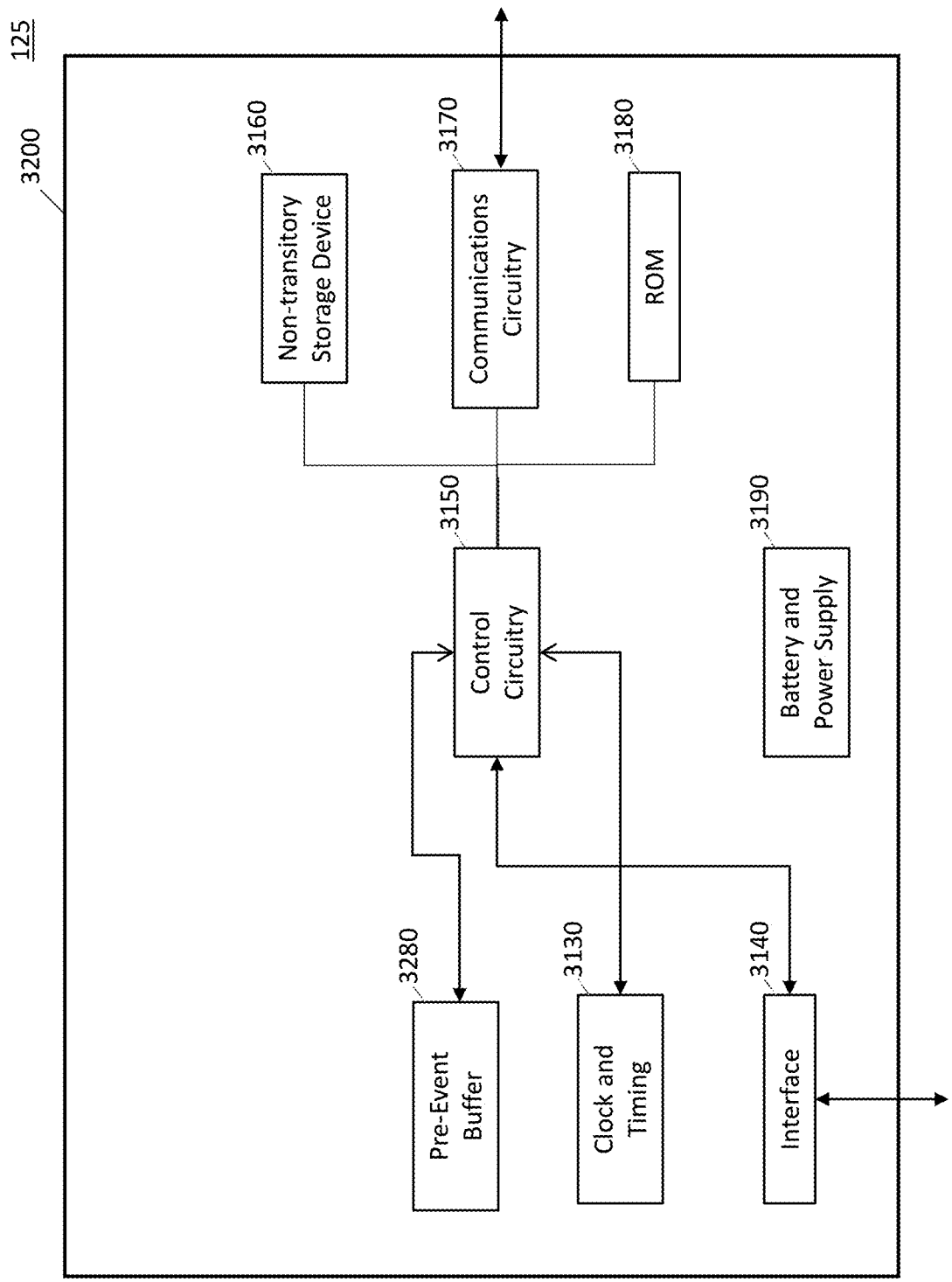
FIG. 3 is a diagram of a recorder according to the present disclosure.

FIG. 2 is an explanatory diagram illustrating a functional configuration example of a camera #1 105 according to an embodiment of the present disclosure. Hereinafter, a functional configuration of the camera #1 105 according to an embodiment of the present disclosure will be described using FIG. 2. Camera #1 105 has a housing 2200 (sometimes referred to as a chassis) that includes a camera imaging module 2300, which includes imaging circuitry 2100, a sensor 2120, an optional shutter control 2130 (such as in the case of a manually actuated camera), and an interface 2140. Other components included in the housing 2200 of the camera #1 105 include control circuitry 2150, non-transitory storage device 2160, a communication circuitry 2170, an optional display 2180, and a battery and power supply 2190. These other components may optionally be included within the camera housing 2200.

The imaging circuitry 2100 includes a lens, an image sensor (e.g., CMOS sensor), and the like, and accumulates electrons for a predetermined period, according to an image that is formed on a light receiving surface of the image sensor through the lens. Then, the imaging circuitry 2100 outputs a signal according to the accumulated electrons to the control circuitry 2150. The control circuitry 2150 executes imaging processing using a signal output from the imaging circuitry 2100 to generate a video stream. Once again, the video is at least one of a still image, a moving image (video) in the visible spectrum, as well as images outside of the visible spectrum, such as images in the Infrared and Ultraviolet spectral ranges.

As previously discussed, the camera #1 105 according to an embodiment may execute imaging processing when the user actuates a user interface e.g., presses down the shutter control 2130, or via interface 2140. Alternatively, the camera #1 105 may operate continuously, and motion detected in the scene, or particular objects (e.g., humans, or particular humans) detected in the scene may trigger a recording. The motion or object-detection may be performed locally at the camera #1 105 or remotely such as at the camera station server 110.

The sensor 2120 optionally contains multiple sensors, including, for example a microphone for acoustic pickup. Also, the sensor 2120 may also include a passive Infrared (PIR) detector that can trigger the operation of a video recording session during an event. The sensor 2120 is provided to face the same direction as an imaging direction of the imaging circuitry 2100 so that motion in the scene or a particular object detected in the scene triggers a recording event.

In the case of the camera #1 105 has a mobility capacity, the sensor 2120 may further include a location sensor, an acceleration sensor, a gyro sensor, a geomagnetic sensor, a temperature sensor, a barometric pressure sensor, a heartbeat sensor, a timer, and date/time recorder. As the location sensor described above, specifically, a Global Navigation Satellite System (GNSS) receiver and/or a communication device may be included, for example. GNSS may include, for example, Global Positioning System (GPS), Global Navigation Satellite System (GLONASS), BeiDou Navigation Satellite System (BDS), Quasi-Zenith Satellites System (QZSS), and Galileo. Positioning technologies may include, for example, a wireless LAN, Multi-Input Multi-Output (MIMO), cellular communication (e.g., position detection using a mobile base station, a femtocell), and near field communication (e.g., Bluetooth Low Energy (BLE), Bluetooth.

The shutter control 2130 is computer actuated, although another button is provided that responds to a press by a user to capture a still image.

The interface 2140 includes a man-machine interface, such as a power button, mode select button, or touch panel to provide local control of the camera #1 105. The interface 2140 also includes electrical connections so peripheral devices (e.g., memory, auxiliary camera, auxiliary power, etc.) may be connected to the device. The interface provides an external DC power port.

The control circuitry 2150 is configured with a processor, such as a central processing unit (CPU), a ROM, and a RAM, and controls operation of each part of the camera #1 105. In the present embodiment, the control circuitry 2150 manages the collection of image/audio data from the imaging circuitry, and fuses it with the sensor data, as needed, to prepare to upload the video information to the recorder 125 via the communication circuitry 2170.

The non-transitory storage device 2160 is configured with, for example, a flash memory or another nonvolatile memory. The non-transitory storage device 2160 stores an image generated by the control circuitry 2150 executing imaging processing.

The communication circuitry 2170 executes wireless communication with another apparatus, such as the controller 130 or a relay computer to the controller 130, or a cloud server on a network by, for example, cellular communication, Wi-Fi, Bluetooth (registered trademark), or Near Field Communication (NFC). However, the communication circuitry 2150 also performs wired communications with a relay computer via a physical interface, such as USB-C, RJ45 or the like.

The display 2180 is an optional display device configured with, for example, a liquid crystal display, an organic EL display, or an LED display. Display content on the display 2180 is controlled by the control circuitry 2150.

The battery and power supply 2190 is configured with a rechargeable battery, and supplies power to each part of the camera #1 105.

The functional configuration example of the camera #1 105 according to an embodiment of the present disclosure has been described above using FIG. 2. Note that the camera #1 105 does not need to include the entire configuration illustrated in FIG. 2. For example, the camera #1 105 does not necessarily include the display 2180. Moreover, the camera #1 105 may include one or more other structural elements than those illustrated in FIG. 2. For example, the camera #1 105 may include a microphone array for recording directional sound (with a gain) in association with the capturing of video.

FIG. 3 is a diagram of the recorder 125. The control circuitry 3150 may also be implemented with the computer described in FIG. 7. The recorder 125 is a separate device from the camera station server 110, and thus has its own housing, recorder housing 3200. Control circuitry 3150 is programmable with program instructions saved in ROM 3180, or alternatively provided externally via interface 3140 that is provided directly to the control circuitry 3150 or via the non-transitory storage device 3160. The control circuitry 3150 receives video image data from the cameras via communication circuitry 3170. Likewise, the control circuitry receives and transmits messages with the camera station server 110, and the cameras. The messages from the camera station server 110 include "pings", as well as control signals such as trigger signals (as will be discussed) to trigger recording of image data from the pre-event buffer memory 3280 in the bulk memory (e.g., non-transitory storage device 3160, or external memory accessible via the interface 3140). The non-transitory storage device 3160 is a read-write memory that serves as the bulk memory for recording video data during access events (triggered by the camera station server 110) or via self-operation. A local memory, or remote memory may also be used for bulk storage via interface 3140. Power is provided by a DC power supply 3190, which also includes a battery backup, which allows the recorder 125 to operate if AC or DC power is removed.

The clock and timing circuitry 3130 provides timing input to the control circuitry 3150 to keep track of when ping signals are expected to be received and when they are actually received. If a ping message is not received during an expected period of time after a last ping message (or control message) was received, the clock and timing circuit 3130 sends a message to the control circuitry 3150, which the control circuitry 3150 construes as an indication that the communication channel between the camera station server 110 and the recorder 125 is down. Moreover, once the communication channel is construed as being down, the control circuitry 3150 triggers the recorder 125 to operate in self-operation mode (sometimes referred to as autonomous recording mode), and begins continuous recording of video until another ping is received, and/or a control signal is received from the camera station server 110. In this way, the video is recorded without explicit instruction/control by the camera station server 110.

Figure 4:
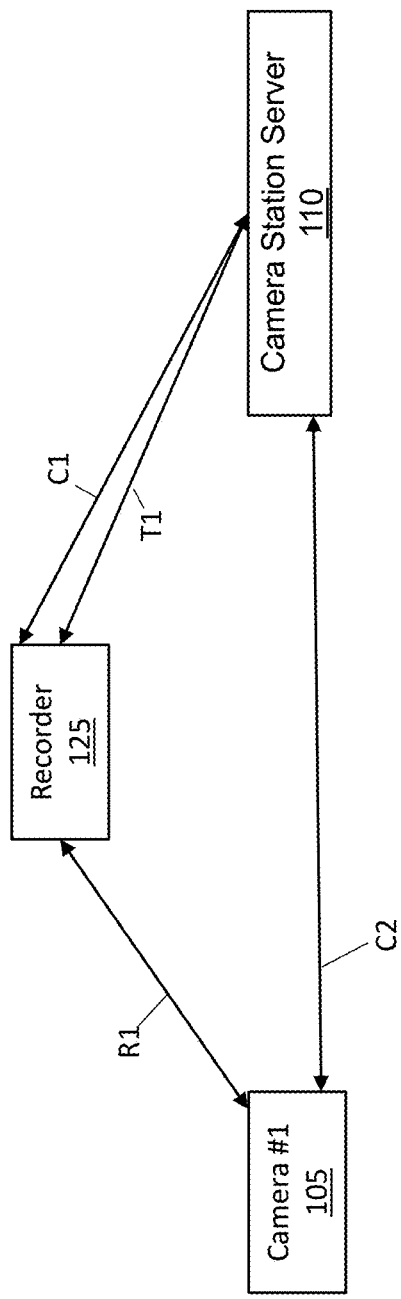
FIG. 4 is a communication diagram that shows different kinds of communications between system components over different communication channels according to the present disclosure.

FIG. 4 is a signaling diagram between the components of the system of FIG. 1. Only camera #1 105 is shown, but it should be understood that a number of cameras, such as 16, can be served by the recorder 125, and each of those cameras operate similarly. Also, it should be understood that the cameras, such as camera #1 125 may be used in combination with, for example, a remote controlled door controller or card reader. The camera station server 110 may provide control signals to provide remote access (e.g., unlock a door next to the camera #1 125) as well as to initiate the camera #1 125 for initial operation. These communications are provided over channel C2, which, as discussed before, may be a dedicated channel, a channel on a private network, or a secure communication over a public network.

The camera station server 110 communicates with the recorder 125 at least with one communication channel C1, which may be a dedicated channel, a channel on a private network, or a secure communication over a public network. In additional to initializing the connection with the recorder 125 of communication channel C1, the camera station server 110 also uses channel C1 to transmit the scheduled ping signals to the recorder 125. A separate communication channel, T1, or the same communication channel C1 may be used to send a trigger signal to the recorder 125. For example, if the camera #1 105 detects the presence of a person approaching a door, and/or a person in the field of view of the camera #1 105 who triggers an event at the door controller, the camera #1 105 and/or door controller may inform the camera station server 110 directly over channel C2, or indirectly via the recorder 125. Communication channel R1 between the recorder 125 and camera #1 105 provides a path for the camera #1 105 to provide the streaming video to the recorder 125. R1 may be a bi-directional channel that receives control signal sent directly from the recorder 125 (e.g., to control the frame rate or resolution if memory is running low), or via the camera station server 110 to provide a control signal (e.g., pan/tilt/zoom).

Figure 5:
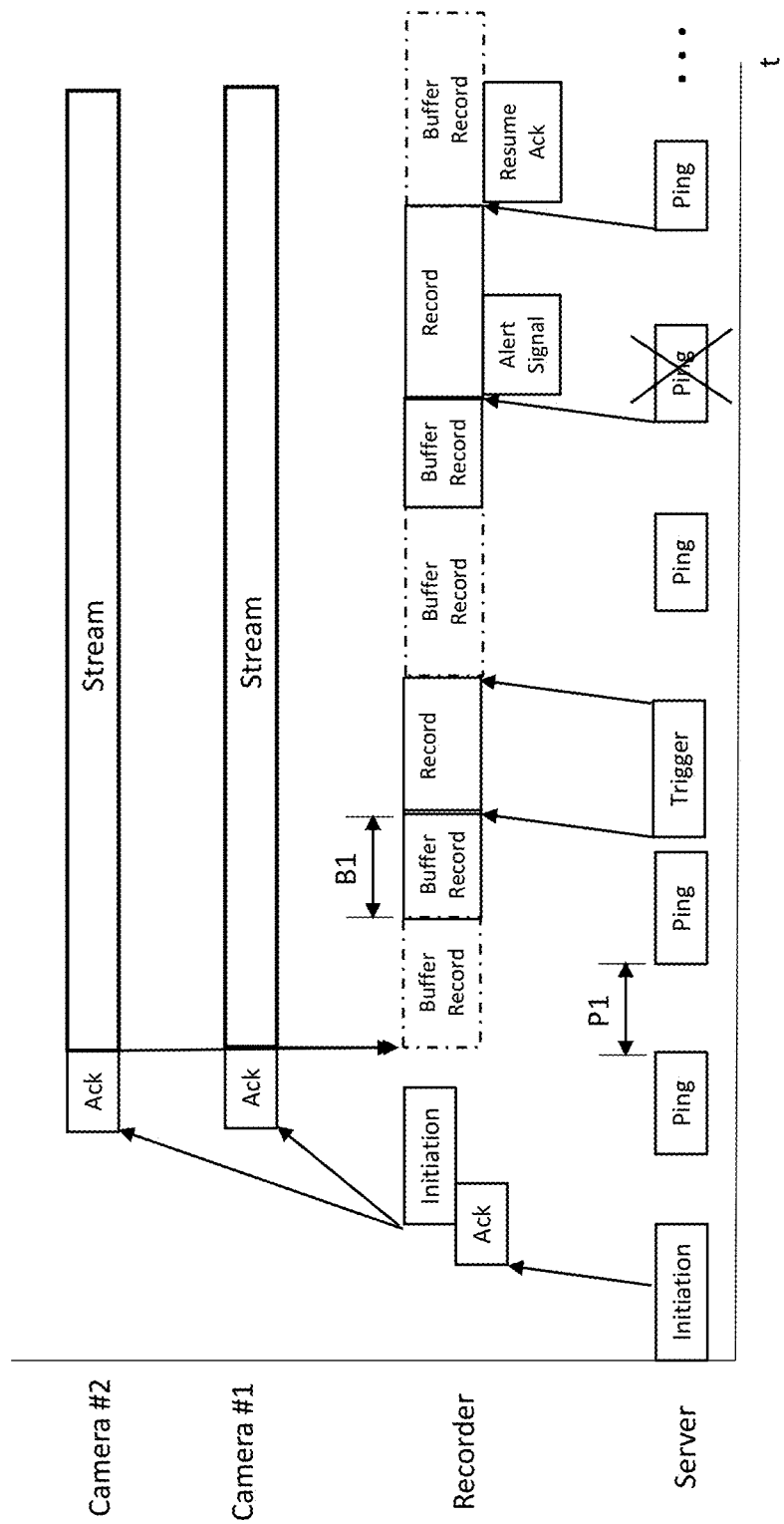
FIG. 5 is a diagram that shows timing and content of different messages communicated between system components according to the present disclosure.

FIG. 5 is a timing and messaging diagram that shows the messages sent between the "server" (camera station server 110 of FIG. 1), "recorder" (recorder 125 of FIG. 1), camera #1 (camera #1 105 from FIG. 1), and camera #2 (camera #2 122 from FIG. 1). In FIG. 5 the server 110 initiates a connection with the recorder 125 via an initiation message. In a dedicated network, not available to $3^{rd}$ parties, there is no need for a secure channel because the communication channel itself provides physical security. Therefore, in a dedicated network, or over a dedicated line, the server 110 merely sends a message to the recorder 125, establishing a communication link between the two devices. In this scenario, the recorder 125 replies with an ACK, and then the recorder 125 allocates communication channels directly with camera #1 and camera #2 via respective initiation messages and receiving corresponding ACK messages. In response to receiving the respective initiation messages and replying with ACKs, the two cameras begin sending a video steam to the recorder 125. The server 110 may optionally establish separate communication control links directly (or via a network, or via the recorder 125) to the cameras. These control links allow the server 110 to issue commands to the cameras, such as pan/tilt/zoom commands to the cameras. Also, the control links may include a link to door controllers which may be adjacent to the cameras. One use case for having the separate control links to the cameras, is that if the server 110, or the recorder 125 detects a disruption in the video feed that is ultimately provided to the server 110 via the recorder 125, the server 110 (or recorder 125) can control a different camera to point to the camera that is experiencing the disruption. In this way, the different camera can provide a video from a different viewpoint in the vicinity of the affected camera. In a security setting, the detection of the disruption in the feed itself may serve as a triggering event that causes the automatic control of a different camera to point to the affected camera.

Returning to the signal flow in FIG. 5, once the video streams are started, the streams are provided to the recorder 125. While FIG. 5 shows streams from two cameras, the recorder 125 is a multi-channel recorder 125 that can accommodate many more camera feeds, such as 16 available camera feeds. For each camera stream, the recorder 125 records the stream in a buffer memory as a buffer record, and provides that buffer record in real time to the server 110 so the server 110 can monitor, display (optionally), and analyze content in the video streams. As previously discussed, the buffer memory in the recorder 125 has a limited capacity, and, as a FIFO memory, the buffer memory retains a rolling window of X minutes of video. The recorder 125 shares the buffered video as a selectable stream that an operator at the server 110 may choose to have displayed, or not. The server 110 nevertheless receives the buffered video and performs various process on the video such as image detection processes, like those described in U.S. Pat. No. 10,748,011 the entire contents of which being incorporated herein by reference in its entirety. The image detection process may identify a person approaching the camera, and respond by triggering another process perhaps (depending on user-selected privacy settings) performing facial recognition to detect prohibited personnel, or perhaps to identify and then obscure the face of the person so as to protect the identity of the person. These security-related image processing techniques may be performed in the background of the server 110, and only generate a trigger when a triggerable event is detected. For example, a triggerable event may cause the server 110 to present the camera feed to the server's display. Another triggerable event may cause the server 110 to send a trigger message to the recorder 125 to record a portion of the camera feed in bulk memory. However, if no trigger event is detected at the server 110, the video is continued to be streamed to the recorder 125, and then from the recorder 125 to the server 110.

As shown in FIG. 5 during normal operation, the server 110 generates a "ping" signal, which is a message to the recorder 125 informing the recorder 125 that the server 110 is active and connected to the recorder 125. In one embodiment a time interval between two adjacent pings is a time P1, and corresponds with a length of the time window, B1, of the buffer record kept by the recorder 125. In this embodiment, P1 is set to be the same or slightly shorter in time than B1, for the reasons to be discussed below. However, P1 may be variable as long as the interval between adjacent pings is known to the recorder 125 and the server 110. For any given interval, regardless of periodic or aperiodic, it is preferable that P1<B1 so as to avoid losing image data, as discussed below.

The recorder 125 monitors pings sent by the server 110, and as long as the pings are received, the recorder 125 remains in a normal operational mode that is under control of the server 110. However, in this normal operational mode the recorder 125 also is on constant watch for a trigger signal sent from the server 110. As discussed above, the trigger signal is a control command that informs the recorder 125 to begin a recording event that stores video data in bulk memory. Moreover, upon receipt of the beginning of the trigger signal, the recorder 125 not only records in bulk memory all newly received video steaming data from one or more cameras, but also the entire contents of the buffer memory. Thus, in addition to recording in bulk memory video that coincides with the beginning of the trigger signal, the recorder 125 also records in bulk memory video contained in the buffer memory (a "buffer record"), which is video that was captured for a time interval B1 before the triggering message was received by the recorder 125. The recorder 125 will continue to record the video stream to bulk memory until the server 110 provides a message indicating that the recorder 125 may resume normal operations again, where it only records video data to its buffer memory. The recorder 125 knows to resume the normal operation in response to receiving an "end of trigger" signal from the server 110, or another discrete message from the server 110 (or another device such as the door controller), or even a timing message set within the recorder 125 depending on the type of trigger signal initially received by the recorder 125 from the server 110 to begin the bulk recording operation. For example, one trigger signal may be a routine "door open" process that is terminated a predetermined amount of time after the door is detected as being open (or closed), and the timing can be kept by the recorder 125. However, in another trigger event, the server 110 maintains control, and does not relieve the recorder 125 from its bulk recording duty until after the server 110 sends a particular message, such as a "stop recording" message.

Thus, in normal operations, the recorder 125 does not record video in the bulk memory and continues to monitor the server 110 commands for pings and trigger signals. However, as recognized by the present inventors, it is possible that the server 110 may lose the connection to the recorder 125, and thus, the recorder 125 will not receive a trigger signal, and thus not record streamed video because it never received a trigger signal. Of course, the loss of the communications may be for purely innocent, technical reasons, but it may also be due to a bad actor who is trying to avoid being recorded while attempting to gain access to a monitored facility. In this more nefarious scenario, it can be imagined that the bad actor physically disables the server 110, or the communication link to the recorder 125 (e.g., "cut the line"), or an RF equivalent way to disrupt communications over a wireless connection. In either way, the recorder 125 will not receive a trigger signal if the server 110 is unable to successfully send messages to the recorder 125.

When the communication link between the recorder 125 and server 110 is down, the recorder 125 will also not be able to receive the expected pings from the server 110. This is represented in FIG. 5 with a large "X" superimposed on the second to last "ping". Thus, because the recorder 125 knows the interval (regardless, if periodic or aperiodic) between expected ping signals, when it does not detect the ping within the expected time interval, the control circuitry in the recorder 125 switches the recorder 125 from normal operation mode (where the recorder 125 takes direction from the server 110) to autonomous recording mode, where the recorder 125 controls the recording to bulk memory of the contents of the buffer memory and newly received video from the camera(s).

Optionally, the recorder 125 may also control other cameras to change their pointing direction to other entry points that are in line-of-sight of the camera. Furthermore, the recorder 125 may also transmit one or more alert signals over other communications channels such as Wi-Fi, Bluetooth, wireless telephony, or auxiliary wired channels. Example messages may be an e-mail, a text message, an HTTP API call, a visual alert (e.g., flashing screen or flashing LED), and audible alert (e.g., speaker that generates an audible noise), or the like.

During the autonomous recording mode, the recorder 125 continues to record the video streams to bulk memory until it receives a command override via a local interface (e.g., a touch panel on the recorder 125), a command signal from the server 110, and/or receipt of a next ping from the server 110. FIG. 5 shows the scenario where the recorder 125 receives a ping after it failed to receive the previous ping (as represented in FIG. 5 as a ping with a large "X" superimposed on it). In response to receiving the ping, the recorder 125 transitions back from autonomous recording mode to normal operation mode, and optionally generates and sends an ACK in response to receiving the ping.

By using the auxiliary communication mechanism of observing an absence of a communication within a scheduled time to control the recorder's mode of operation, the server 110 and recorder 125 allow the recorder 125 to operate in a fail-safe mode to securely store captured video of a scene before, and after, it was detected that communications with the server 110 was compromised. Furthermore, by ensuring that the interval P1 between pings is shorter than the rolling buffer window B1, no video is lost while transitioning from normal operational mode to autonomous recording mode.

Furthermore, an advantage in the recorder 125 being a passive actor in its monitoring of pings from the server 110, is that the recorder 125 is already performed a lot of processing functions, and if it were the device that was required to ping the server 110, it would create a greater processing load on the recorder 125. Likewise, the amount of message traffic on the channel would be higher if the recorder 125 generated the pings. This is because the recorder has a limited buffer memory, and so if the recorder 125 needed to build in round-trip-time (RTT) for receiving an ACK from the server 110, that RTT would use up some of the capacity of the buffer memory and need to send the ping message more frequently to account for the RTT.

On the other hand, by passively waiting for receipt of pings from the server 110, the recorder 125 can immediately switch over to autonomous recording mode when it determines it has not received a ping within the predetermined timing window. A further benefit of the recorder 125 being passive is that the recorder 125 need not know which server 110 it is monitoring. On the other hand, if the recorder 125 were to be the device generating the pings, the recorder 125 would have to keep track of which server it was to be engaged with.

Figure 6:
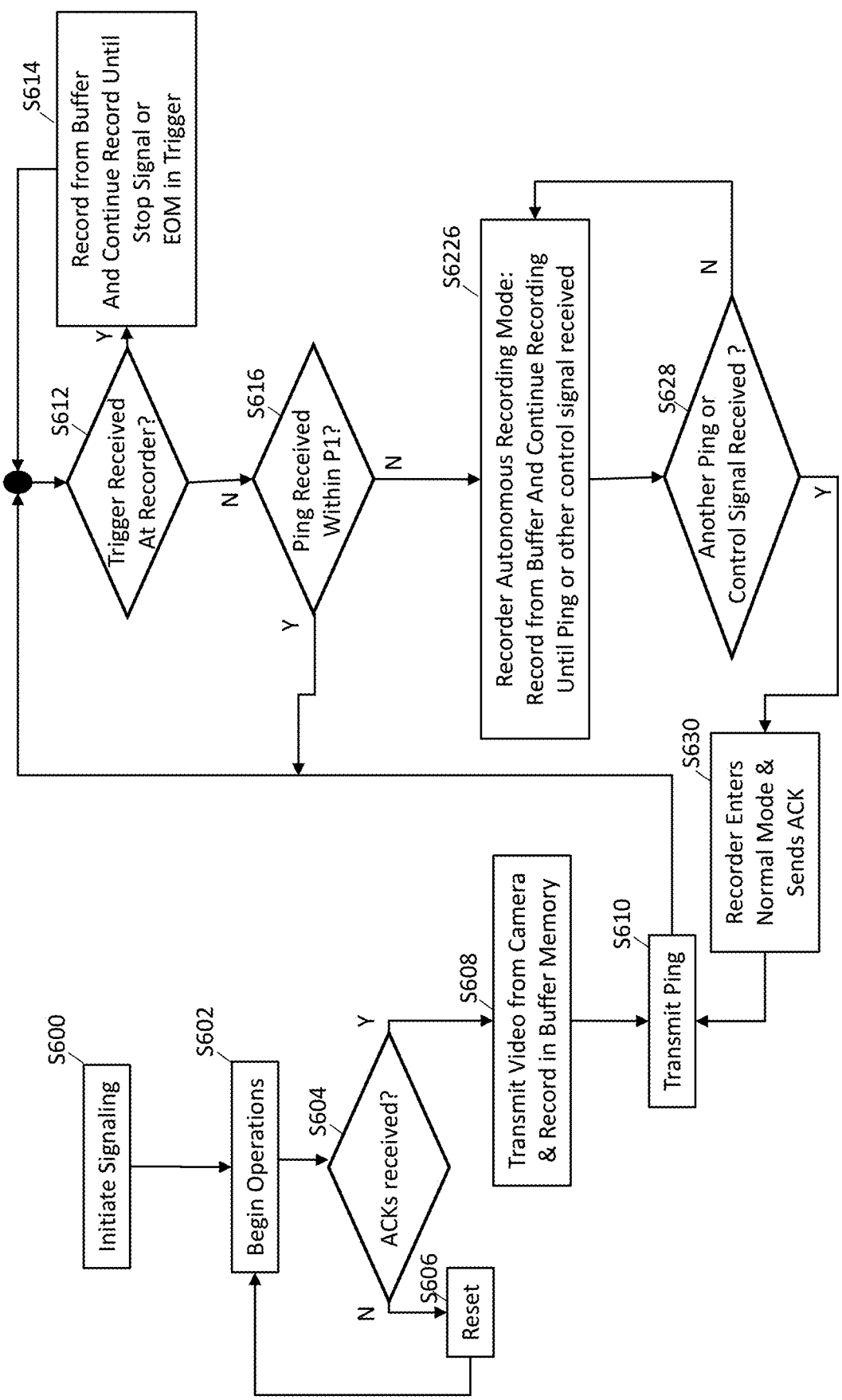
FIG. 6 is a flowchart of a process flow performed by an embodiment of the present disclosure.
Figure 7:
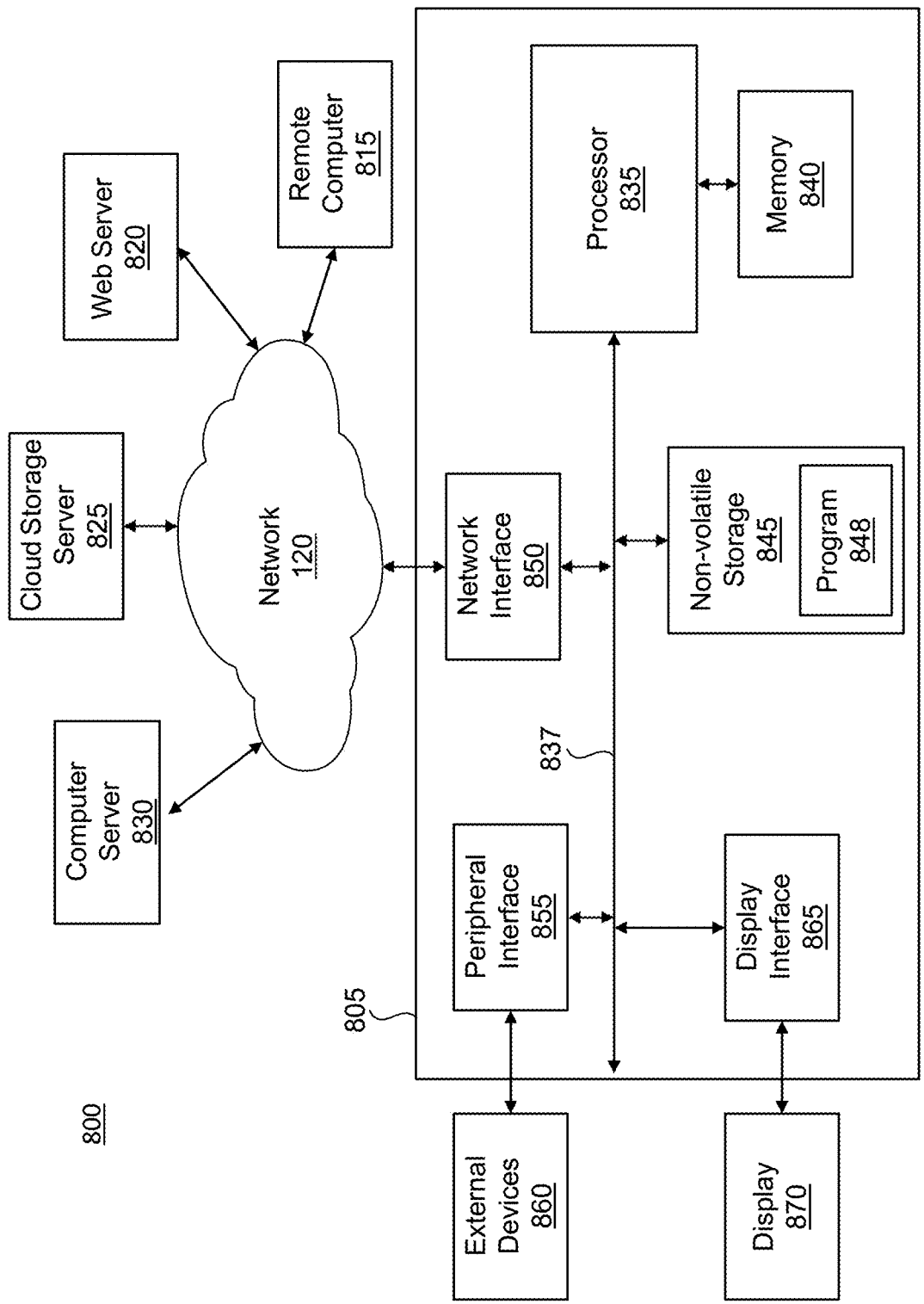
FIG. 7 is a block diagram of a computer-based system on which embodiments of the recorder and the server of the present system may be implemented.

FIG. 6 is a flowchart of a process performed according to the video recording and control system 100. The process begins in step S600, where the camera station server 110, recorder 125, and cameras connect to one another and exchange handshake messages to confirm the establishment of communication channels therebetween. Once initialized, the process proceeds to step S602 where each of the devices begins to operate in normal operations. Subsequently, the recorder 125 waits for an ACK from the cameras, and the camera station server 110 waits for an ACK from the recorder 125. The process then performs a query in step S604 to determine if all of the ACKs have been received. If not, the device(s) that have not transmitted an ACK is reset in step S606 and the process returns to step S602. However, if the ACKs have been received, the process proceeds to step S608 where the recorder 125 enters the normal operation mode. In the normal operation mode, the recorder 125 records video streams from the respective channels only in buffer memory. Subsequently in step S610, the camera station server 110 transmits pings at known (predetermined) intervals.

The process then proceeds to a query in step S612 regarding whether a trigger sent from the camera station server 110 has been received by the recorder 125. If so, in step S614, the recorder 125 records into bulk memory the contents of the buffer memory as well as video stream data from the cameras. The recorder 125 continues to record the video stream from the cameras until it receives a message or another indication (e.g., internal timer) to stop the recording in bulk memory and return to the normal operation mode by returning to the query at step S612. However, if the response to the query in step S612 is negative, the process proceeds to the query in step S616 where the circuitry in the recorder 125 determines whether it has received a ping within the predetermined interval P1. If the ping has been timely received, the process proceeds to the query in step S612 and the recorder 125 remains in the normal operation mode. However, if the response to the query in S616 is negative, the process proceeds to step S6226, in which the recorder 125 enters the autonomous recording mode, and begins to record the existing buffer contents in bulk memory as well as newly received data from the video stream provided by the cameras. The process then continues to the query in step S628 where the recorder 125 determines whether it has received another ping signal or a control signal, which would indicate the communication channel with the camera station server 110 has been restored, and it is safe for the recorder 125 to resume normal operation under control of the camera station server 110. If the response to the query in step S628 is negative, the process returns to step S226. However, if the response is affirmative, the process proceeds to step S630, where the recorder 125 re-enters the normal operation mode and confirms this state by sending an ACK to the camera station server 110. After step S630, the process returns to step S610, where the system operates in its normal operation mode.

FIG. 7 illustrates a block diagram of a networked computer system 800 that includes a computer 805 that may implement the various embodiments described herein for the processing circuitry for the recorder 125, or the structure of the camera station server 110 (as shown in FIG. 1). Alternatively, the computer 805, in combination with other components of the networked computer system 800 may implement the various embodiments described herein for the processing circuitry for the recorder 125, or the structure of the camera station server 110.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 1 is a functional block diagram illustrating a networked system 800 of one or more networked computers and servers. In an embodiment, the hardware and software environment illustrated in FIG. 7 may provide an exemplary platform for implementation of the software and/or methods according to the present disclosure.

Referring to FIG. 7, a networked system 800 may include, but is not limited to, computer 805 (which may serve as the processing circuitry for the recorder 125, or the structure of the camera station server 110, of FIG. 1), network 810, remote computer 815, web server 820, cloud storage server 825 and computer server 830. In some embodiments, multiple instances of one or more of the functional blocks illustrated in FIG. 7 may be employed collectively with computer 805 to serve as the processing circuitry for the recorder 125, or the structure of the camera station server 110.

Additional detail of computer 110 is shown in FIG. 7. The functional blocks illustrated within computer 110 are provided only to establish exemplary functionality and are not intended to be exhaustive. And while details are not provided for remote computer 815, web server 820, cloud storage server 825 and computer server 830, these other computers and devices may include similar functionality to that shown for computer 110.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Obviously, numerous modifications and variations of the present disclosure are possible in light of the above teachings. It is therefore to be understood that within the scope of the appended claims, the disclosure may be practiced otherwise than as specifically described herein.

LISTING OF ELEMENTS

100 Video Recording and Control System
105 Camera #1
110 Camera Station Server
120 Network
122 Camera #2
125 Recorder
815 Remote Computer
820 Web Server
825 Cloud Storage Server
830 Computer Server
835 Processor
837 Bus
840 Memory
845 Non-Volatile Storage
848 Program
850 Network Interface
855 Peripheral Interface
865 Display Interface
860 External Devices
870 Display
2200 Camera Housing
2100 Imaging Circuitry
2120 Sensor
2130 Shutter Control
2140 Interface
2150 Control Circuitry
2160 Non-transitory Storage Device
2170 Communications Circuitry
2180 Display
2190 Battery and Power Supply
3200 Recorder Housing
3130 Clock and Timer
3140 Interface
3150 Control Circuitry
3160 Non-transitory Storage Device 3170 Communications Circuitry
3180 Read Only Memory (ROM)
3190 Battery and Power Supply
3200 Recorder Housing
3280 Pre-Event Buffer

The invention claimed is:

1. A method of recording video in a recorder, comprising:
checking by recorder circuitry receipt of a ping signal sent from a server to the recorder, the ping signal being expected to be received by the recorder circuitry within a predetermined time interval after an earlier ping signal was received by the recorder, or as an initial ping signal that was expected to be received within the predetermined time interval after initiation;
in response to a determination by the recorder circuitry that the ping signal was not received within the predetermined time interval, the recorder entering an autonomous recording mode in which the recorder performs recording of video provided from at least one camera; and
continuing operation of the recorder in the autonomous recording mode until at least one of
receiving another ping signal by the recorder circuitry, or
receiving a control signal from the server that directs the recorder to stop recording the video provided from the at least one camera.

2. The method of claim 1, further comprising:
prior to entering the autonomous recording mode, recording video provided from at least one camera in a buffer memory.

3. The method of claim 2, wherein:
the recording video provided from at least one camera further comprises, after the recorder enters the autonomous recording mode,
recording video from the buffer memory in a bulk memory, and
recording in the bulk memory, the video provided from the at least one camera after the recorder has entered the autonomous recording mode.

4. The method of claim 3, wherein:
the bulk memory is a semiconductor memory.

5. The method of claim 1, further comprising:
in response to entering the autonomous recording mode, transmitting an alert message from the recorder.

6. The method of claim 5, wherein:
the transmitting includes transmitting the alert message as at least one of a text message or an e-mail on a different communication channel than a communication channel on which the earlier ping signal was received or the initial ping signal was expected to be received.

7. The method of claim 1, wherein
the predetermined interval is a fixed interval between sequential pairs of ping signals in a stream of ping signals expected to be received by the recorder circuitry after transmission from the server.

8. The method of claim 1, wherein
the predetermined interval is an interval that varies in a known pattern between sequential pairs of ping signals in a stream of ping signals expected to be received by the recorder circuitry after transmission from the server.

9. The method of claim 1, further comprising:
in response to the entering the autonomous recording mode, sending a camera control signal to another camera to point toward the at least one camera and capture video images in a scene that includes the at least one camera.

10. The method of claim 1, further comprising:
after a conclusion of the autonomous recording mode, recording by the recorder video provided from the at least one camera in response to a trigger signal received by the recorder from the server.

11. A video recorder, comprising:
a memory;
a communication interface; and
circuitry, the circuitry configured to
check receipt of a ping signal via the communication interface sent from a server, the ping signal being expected to be received by the circuitry within a predetermined time interval after an earlier ping signal was received via the communication interface or as an initial ping signal that was expected to be received within the predetermined time interval after initiation,
in response to a determination by the circuitry that the ping signal was not received within the predetermined time interval, switch the video recorder into an autonomous recording mode in which the video recorder records video provided from at least one camera, and
continue operation in the autonomous recording mode until at least one of
another ping signal is received via the communication interface, or
a control signal is received via the communication interface from the server, and the circuitry stops recording the video provided from the at least one camera in response to receipt of the control signal.

12. The video recorder of claim 11, wherein:
the memory includes a buffer memory, and
prior to entering the autonomous recording mode, the circuitry is configured to record in the buffer memory video provided from at least one camera.

13. The video recorder of claim 12, wherein:
the memory further includes a bulk memory, and
after the video recorder enters the autonomous recording mode the circuitry is configured to
record video from the buffer memory in the bulk memory, and
also record in the bulk memory, the video provided from the at least one camera after the recorder has entered the autonomous recording mode.

14. The video recorder of claim 11, wherein:
in response to entering the autonomous recording mode, the circuitry is configured to transmit via the communication interface an alert message, the alert message being one of a text message, an e-mail, an HTTP API call, a visual alert, and audible alert.

15. The video recorder of claim 14, wherein:
the circuitry is configured to transmit the alert message via the communication interface on a different communication channel than a communication channel on which the earlier ping signal was received.

16. The video recorder of claim 11, wherein:
the predetermined interval is a fixed periodic interval between sequential pairs of ping signals in a stream of ping signals expected to be received by the communication interface after transmission from the server.

17. The video recorder of claim 11, wherein:
the predetermined interval is an interval that varies in a known pattern between sequential pairs of ping signals in a stream of ping signals expected to be received by the communication interface after transmission from the server.

18. The video recorder of claim 11, wherein:
in response to the entering the autonomous recording mode, the circuitry being configured to send a camera control signal to another camera to point toward the at least one camera and capture video images in a scene that includes the at least one camera.

19. A video recording and control system comprising:
at least one camera that captures a video;
a server; and
a video recorder that includes
  a memory,
  a communication interface, and
  circuitry configured to
    check receipt of a ping signal via the communication interface sent from the server, the ping signal being expected to be received by the circuitry within a predetermined time interval after an earlier ping signal was received via the communication interface or as an initial ping signal that was expected to be received within the predetermined time interval after initiation,
    in response to a determination by the circuitry that the ping signal was not received within the predetermined time interval, switch the video recorder into an autonomous recording mode in which the video recorder records video provided from the at least one camera, and
    continue operation in the autonomous recording mode until at least one of
      another ping signal is received via the communication interface, or
      a control signal is received via the communication interface from the server, and the circuitry stops recording the video provided from the at least one camera in response to receipt of the control signal.

20. A non-transitory computer readable storage device having computer readable instructions stored therein that in response to being executed by a processor cause the processor to implement the method of recording video according to claim 1.

* * * * *